(12) United States Patent
Chaudhuri et al.

(10) Patent No.: US 8,046,339 B2
(45) Date of Patent: Oct. 25, 2011

(54) EXAMPLE-DRIVEN DESIGN OF EFFICIENT RECORD MATCHING QUERIES

(75) Inventors: Surajit Chaudhuri, Redmond, WA (US); Bee Chung Chen, Sunnyvale, CA (US); Venkatesh Ganti, Redmond, WA (US); Shriraghav Kaushik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/758,202

(22) Filed: Jun. 5, 2007

(65) Prior Publication Data

US 2008/0306945 A1 Dec. 11, 2008

(51) Int. Cl.
*G06F 17/30* (2006.01)
(52) U.S. Cl. ........................... 707/692; 707/797
(58) Field of Classification Search .................. 707/714, 707/692, 797, E17.002
See application file for complete search history.

(56) References Cited

U.S. PATENT DOCUMENTS

| | | | |
|---|---|---|---|
| 5,960,430 A | 9/1999 | Haimowitz et al. | |
| 6,067,552 A | 5/2000 | Yu | |
| 6,240,408 B1 | 5/2001 | Kaufman | |
| 6,243,713 B1 | 6/2001 | Nelson et al. | |
| 6,295,533 B2 | 9/2001 | Cohen | |
| 6,804,667 B1 | 10/2004 | Martin | |
| 6,839,701 B1 | 1/2005 | Baer et al. | |
| 6,968,332 B1 | 11/2005 | Milic-Frayling et al. | |
| 6,975,766 B2 | 12/2005 | Fukushima | |
| 7,076,485 B2 | 7/2006 | Bloedorn | |
| 7,152,060 B2 * | 12/2006 | Borthwick et al. | 707/3 |
| 7,287,019 B2 * | 10/2007 | Kapoor et al. | 707/2 |
| 7,730,060 B2 | 6/2010 | Chakrabarti et al. | |
| 2002/0147710 A1 | 10/2002 | Hu | |
| 2003/0033288 A1 | 2/2003 | Shanahan et al. | |
| 2004/0139072 A1 | 7/2004 | Broder et al. | |
| 2004/0249789 A1* | 12/2004 | Kapoor et al. | 707/2 |
| 2005/0027717 A1 | 2/2005 | Koudas et al. | |
| 2005/0216443 A1 | 9/2005 | Morton et al. | |
| 2005/0222977 A1 | 10/2005 | Zhou et al. | |
| 2005/0234881 A1 | 10/2005 | Burago et al. | |
| 2006/0047691 A1 | 3/2006 | Humphreys et al. | |
| 2006/0117003 A1 | 6/2006 | Ortega et al. | |
| 2006/0122978 A1 | 6/2006 | Brill et al. | |
| 2006/0161522 A1 | 7/2006 | Dettinger et al. | |
| 2006/0282414 A1 | 12/2006 | Sugihara et al. | |

OTHER PUBLICATIONS

Vance et al, "Rapid Bushy Join-Order Optimization iwth Cartesian Products", Jun. 1996, Proceedings of AMC SIGMOD Conference of Management of Data, pp. 35-46.*
Answers.com, Dictionary: normalize, Answers.com, http://www.answers.com/topic/normalize.*
Absolute Astronomy.com, Hyperrectangle, http://www.absoluteastronomy.com/topics/Hyperrectangle.*

(Continued)

*Primary Examiner* — Shahid Alam
*Assistant Examiner* — Amanda Willis

(57) ABSTRACT

Example-driven creation of record matching queries. The disclosed architecture employs techniques that exploit the availability of positive (or matching) and negative (non-matching) examples to search through this space and suggest an initial record matching query. The record matching task is modeled as that of designing an operator tree obtained by composing a few primitive operators. This ensures that record matching programs be executable efficiently and scalably over large input relations. The architecture joins records across multiple (e.g., two) relations (e.g., R and S). The architecture exploits the monotonicity property of similarity functions for record matching in the relations, in that, any pair of matching records have a higher similarity value than non-matching record pairs on at least one similarity function.

20 Claims, 14 Drawing Sheets

OTHER PUBLICATIONS

Shekhar et al, Encyclopedia of GIS, Springer, 2008 ISBN, http://books.google.com/books?id=6q2IOfLnwkAC&pg=PA1060&Ipg=PA1060&dp=%22skyline%22+and +hyperrectangle&source=bI&outs=0W9n5170n&sig=tAbEKGE-OTd3ImYuqYTx0BXN730&hI=en&ei=aP8nSrnQK4mEtwfX0My1Bg&sa=X&oi=book_result&ct=result&resnum=1#PPA1056,M1.*

Silva et al, The Similarity Join Database Operator; Department of Computer Science, Purdue University, Indiana, USA; Microsoft Corporation, Washington, USA; Nov. 19, 2009; p. 12.*

Webopedia, What is a query?, http://www.webopedia.com/TERM/q/query.html, p. 1.*

Webopedia, What is a query?, http://www.webopedia.com/TERM/Q/query.html, p. 1, Aug. 8, 2002.*

Answers.com, Dictonary: normalize, Answers.com, http://www.answers.com/topic/normalize, May 23, 2005.*

Absolute Astronomy.com, Hyperrectangle, http://www.absoluteastronomy.com/topics/Hyperrectangle, 2009.*

Chaudhuri, et al., "Robust and Efficient Fuzzy Match for Online Data Cleaning", SIGMOD, Jun. 9-12, 2003, ACM, 2003, pp. 313-324.

Cohen, "Integration of Heterogeneous Databases without Common Domains Using Queries Based on Textual Similarity", SIGMOD, 1998, ACM, pp. 12.

Chaudhuri, et al., "A Primitive Operator for Similarity Joins in Data Cleaning", IEEE, 2006, pp. 12.

Agichtein et al.; "Querying Text Databases for Efficient Information Extraction"; Columbia University, ICDE, IEEE, 2003; pp. 1-12.

Cheng et al.; "Entity Search Engine: Towards Agile Best-Effort Information Integration Over the Web"; CIDR; 2007; pp. 1-6.

Pasca; "Acquisition of Categorized Named Entities for Web Search"; Google Inc.; CIKM, ACM; Nov. 8-13, 2004; pp. 137-145.

Popov et al.; "KIM—Semantic Annotation Platform"; vol. 2870; Springer Berlin; 2003; pp. 1-16.

* cited by examiner

BestHyperRectangle($\Delta^+$, $\Delta^-$, $d$)
Initialization: $C = [-\varepsilon,\ldots,-\varepsilon]$ where $\varepsilon > 0$ is a small constant.
(1) Build the skyline $S^-$ of negative points $\Delta^-$
(2) QuickCorners($\Delta^+$, $\Delta^-$, $S^-$, ref $C$, $d$, 0)
(3) AdjustCorner(ref $C$, $\Delta^+$)

QuickCorners($\Delta^+$, $\Delta^-$, $S^-$, ref $C$, $d$, $d'$)
/* Stop conditions */
(1) if ($d' > d$) return
(2) If $ValidCorner$ ($C$, $S^-$)
    return $v = Coverage(urect(C), \Delta^+)$
/* Recursion */
(3) Else, randomly pick a point $p \in S^-$ which strongly dominates $C$.
(4) $v^* = 0$; $C^* = null$
(5) foreach dimension $i$,
    $C' = [C[1],\ldots,p[i],\ldots,C[D]]$
    $d'' = d'$
    if ($C[i] == -\varepsilon$) $d'' = d' + 1$
    $v = $ QuickCorners($\Delta^+$, $\Delta^-$, $S^-$, $C'$, $d$, $d''$)
    if ($v > v^*$) then $v^* = v$ ; $C^* = C'$ endif
  end foreach
(6) $C = C^*$

ValidCorner($C$, $S^-$)
(1) foreach $p \in S^-$
(2)    if $p$ strongly dominates $C$
          return false
(3) return true

AdjustCorner(ref $C$, $\Delta^+$)
foreach dimension $i$
    $C'[i] = $ MIN $\{p[i]$ such that $p \in \Delta^+$ strongly dominates $C\}$
end foreach
$C = \dfrac{C + C'}{2}$

*FIG. 6*

EXAMPLE-DRIVEN DESIGN OF EFFICIENT RECORD MATCHING QUERIES

BACKGROUND

Data cleaning is a critical element for developing effective business intelligence applications. The inability to ensure data quality can negatively affect downstream data analysis, and ultimately, key business decisions. An important data cleaning operation is that of record matching that identifies records which match the same real world entity. For example, owing to various errors in data and to differences in conventions of representing data, product names in sales records may not match exactly with records in master product catalog tables. In these situations, it is desirable to match similar records across relations.

Record matching is a problem of great significance for a variety of business intelligence applications. Implementations of record matching rely on exact as well as approximate string matching (e.g., edit distances) and use of external reference data sources. Record matching can be viewed as a query composed of a small set of primitive operators. However, formulating such record matching queries is difficult and depends on the specific application scenario. Specifically, the number of options both in terms of string matching operations as well as the choice of external sources can be daunting.

This problem of matching similar records has been studied in the context of record linkage and of identifying approximate duplicate entities in databases. Given two relations R and S, the record matching problem is to identify pairs of records in R×S that "represent" the same real world entity. Typically, both relations R and S can be quite unclean with many incorrect, abbreviated, and missing values, and therefore, the task of designing a program for accurately matching records is challenging. Such challenges arise in record matching scenarios across a variety of other domains, including, but not limited to, matching customers across two sales databases, matching patient records across two databases in a large hospital, matching product records across two catalogs, etc. In all these scenarios, a primary requirement in addition to accuracy is that the record matching programs also be efficiently executable over very large relations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs techniques that exploit the availability of positive (or matching) and negative (non-matching) examples (each of which is a pair of records from R×S) to search through this space and suggests an initial record matching query. Such queries can be subsequently modified by the programmer as needed. The record matching task is modeled as that of designing an operator tree obtained by composing a few primitive operators. This ensures that record matching programs be executable efficiently and scalably over large input relations.

The architecture joins records across multiple (e.g., two) relations (e.g., R and S). The architecture exploits the monotonicity property of similarity functions for record matching in the relations. The monotonicity property requires that any pair of matching records have a higher similarity value than non-matching record pairs on at least one similarity function. In general, the architecture can match records in multiple relations. For ease of exposition, however, pairs of records from R×S are considered for matching.

The disclosed techniques assist a programmer in designing the highest "quality" record matching operator trees. Informally, the quality of a record matching operator tree Q with respect to a set of examples is the number of matching examples included in the result of Q subject to the constraint that none or very few (less than a user-specified fraction $\beta$) given non-matching examples are in the result of Q. Alternative formulations are also described. Because operator trees are returned, a programmer is easily able to interpret, review, and modify the operator tree if required.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 6 illustrates the algorithm for determining the maximum 0-neg rectangles.

DETAILED DESCRIPTION

Figure 1:
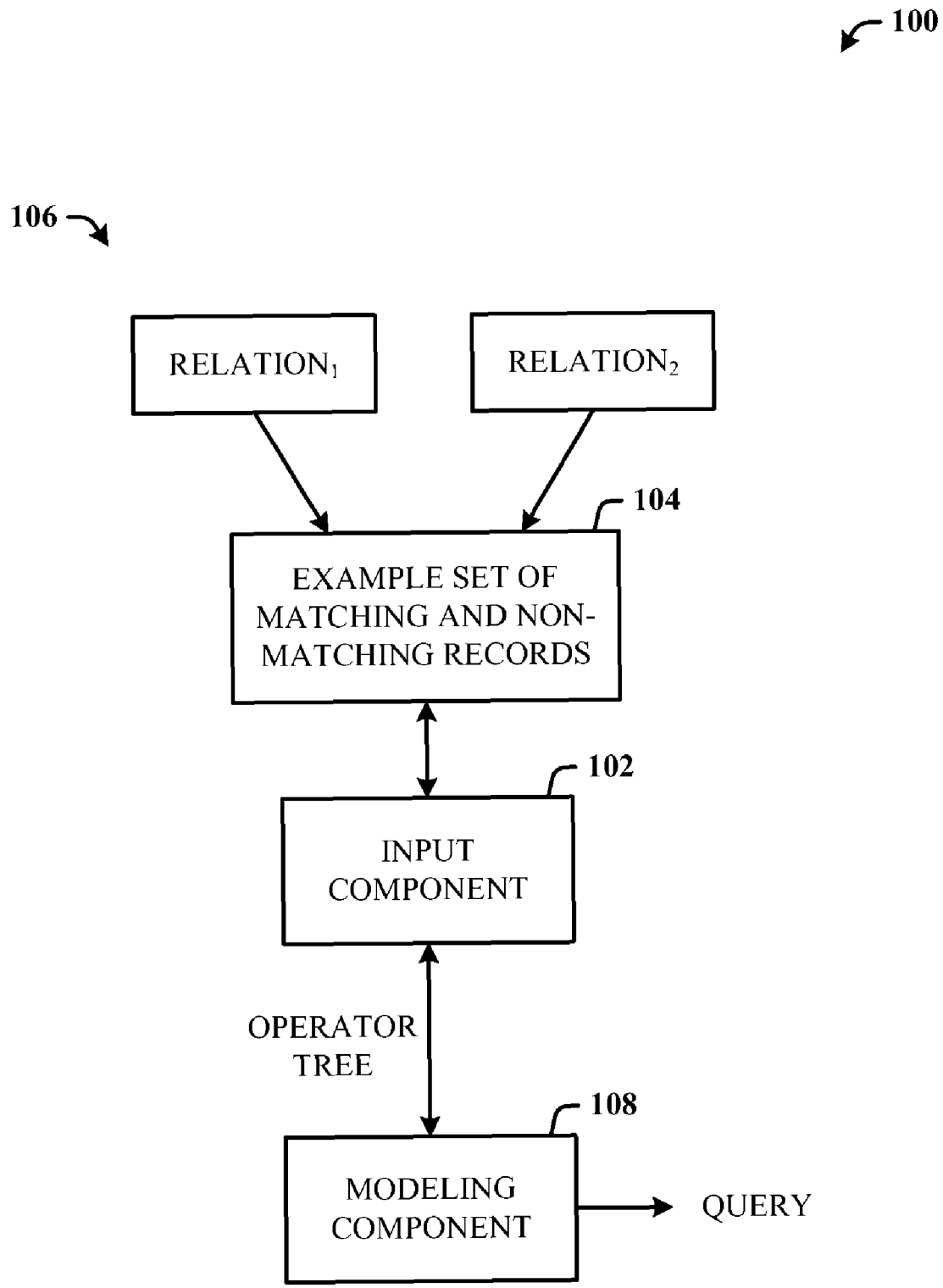
FIG. 1 illustrates a computer-implemented query system.

The disclosed architecture provides that record matching programs can be viewed as efficiently executable operator trees built over a small set of relational and data cleaning operators. Since designing accurate operator trees is challenging, the disclosed architecture employs techniques for creating operator trees that best match a given set of examples. Accordingly, a programmer is now able to easily interpret, review, and modify the resulting operator trees.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented query system 100. The system 100 includes an input component 102 for receiving an example set 104 of matching records and non-matching records between multiple (e.g., two) input relations 106 (e.g., relation R and relation S). The system 100 can also include a modeling component 108 for generating a query based on an operator tree that maximizes identification of the matching records between the two input relations 106 (denoted RELATION$_1$ and RELATION$_2$).

The operator tree includes similarity joins and unions. In a more specific implementation, the similarity joins and unions operator tree is bounded. In yet another implementation, the similarity joins and unions operator tree employs an attribute value transformation operator. The modeling component 108 generates the operator tree based on monotonic property of a similarity functions. Other characteristics of the disclosed architecture are that the example set can be provided manually, the operator tree can be modified manually, and the two input relations can be joined based on a join predicate that is a thresholded linear combination.

Figure 2:
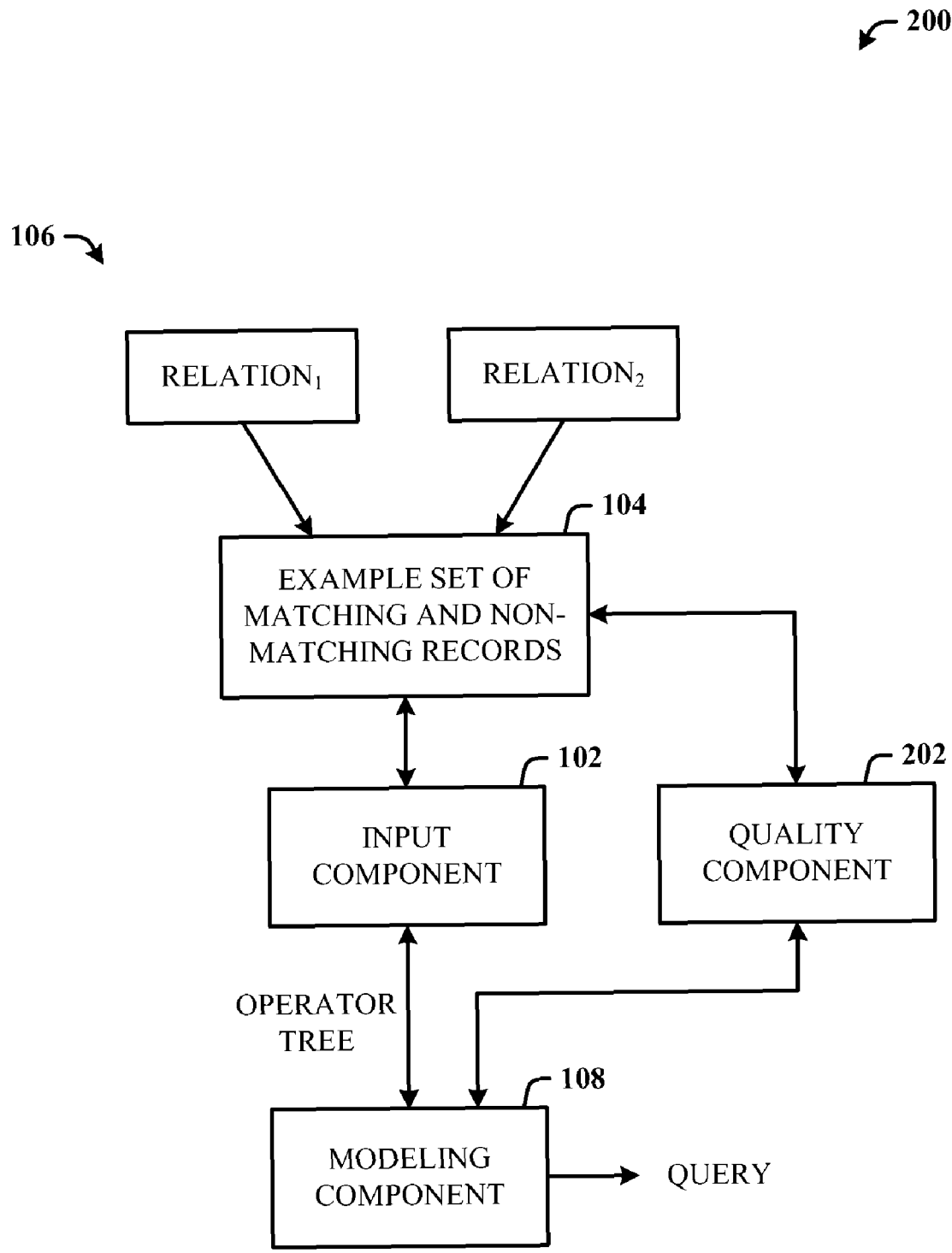
FIG. 2 illustrates a system that further employs a quality component for quantifying quality of the operator tree based on the matching and non-matching records.

FIG. 2 illustrates a system 200 that further employs a quality component 202 for quantifying quality of the operator tree based on the matching and non-matching records. The quality of the query, as represented by the quality of the operator tree, can be based on the non-matching records being less than a user-specified fraction of the matching records in the result. These and other characteristics will now be described in greater detail.

As described herein, it is assumed that the schemas of R and S have been reconciled (i.e., attribute names in R have been mapped to corresponding attribute names in S). Further, it is assumed for ease of exposition and without loss of generality that the corresponding attribute names in R and S are identical. Let an attribute ID be an identifier attribute in both R and S.

A similarity joins and unions (SJU) operator tree will now be defined. Hereinafter, this class can be extended with attribute value transformation operators.

Let $g_1, \ldots, g_N$ be similarity functions such that $0 \leq g_i(v_1, v_2) \leq 1$ and $g_i(v_1, v_2) = 1$ iff $v_1 = v_2$. Let $A_1, \ldots, A_C$ denote the column sequences in R and S for comparison using one or more similarity functions, for example, $A_1 = \langle City \rangle$, $A_2 = \langle City, State \rangle$, .... Note that, in general, different column sequences (e.g., $R.\langle City \rangle$ and $S.\langle City, State \rangle$) can be concatenated while comparing two tuples across R and S. For ease of exposition, and without loss of generality, it is assumed that the column sequence concatenations compared across R and S are identical. Use r.A to denote the concatenation of (with a white space delimiter inserted between) attribute values in a column sequence A in the relation R.

Given any pair of tuples r∈R and s∈S, let $g_j(r.A_i, s.A_i)$ denote the similarity using $g_j$ between attribute value concatenations $r.A_i$ and $s.A_i$. For example, jaccard(r.⟨City, State⟩, s.⟨City, State⟩) compares the jaccard similarity between the strings obtained by concatenating city and state values of r and s. Let $g_j(R.A_i, S.A_i) > \alpha$ denote a similarity function predicate which for any pair of records r∈R and s∈S returns true if $g_j(R.A_i, S.A_i) > \alpha$.

Definition 1. The similarity join between relations R and S over similarity function predicates $g_{j_1}(R.A_{i_1}, S.A_{i_1}) > \alpha_1, \ldots, g_{j_d}(R.A_{i_d}, S.A_{i_d}) > \alpha_d$ is the join between R and S where the join predicate is $\wedge_{j=1}^{d} g_j(R.A_{ij}, S.A_{ij}) > \alpha_j$.

Figure 3:
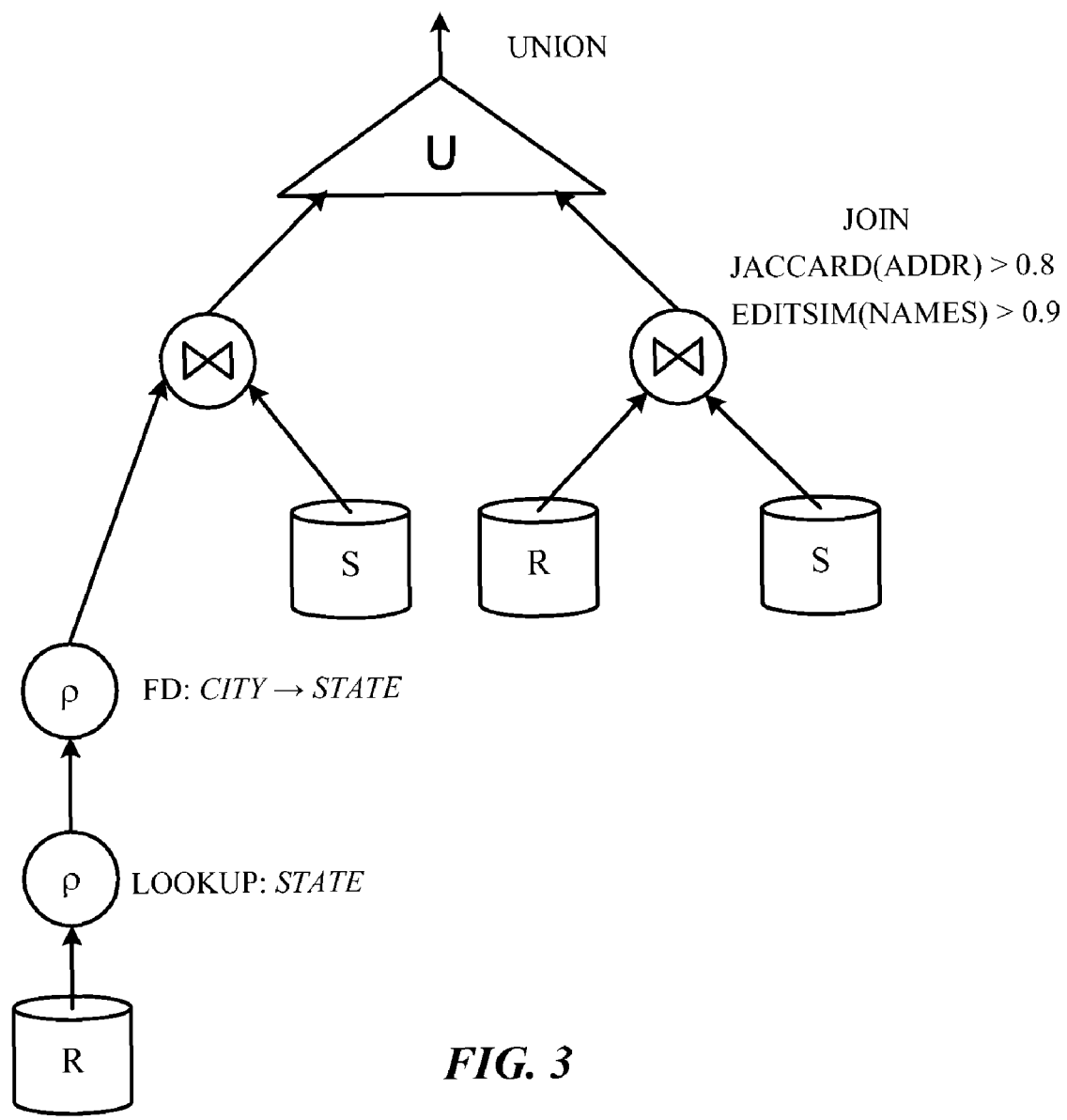
FIG. 3 illustrates an exemplary operator tree involving union, attribute transformation operations, and similarity join predicates.

FIG. 3 illustrates an exemplary operator tree 300 involving union, attribute transformation operations (the ρ nodes, which will be defined later), and similarity join predicates. For example, edit(R.Name, S.Name)>0.9 ∧ jaccard(R.Address, S.Address)>0.8 is an example of a similarity join as shown in the rightmost path in FIG. 3. Any operator tree which is a union of similarity joins is an SJU (similarity joins and unions) tree. Note that the class of SJU trees is rich enough to include many conventional record matching techniques.

Given two relations, there are a large number of choices for creating a record matching operator tree. Further, these choices usually lead to different solutions (identifying different subsets of R×S as matching pairs). To identify the best record matching operator tree among all possible candidates, the quality of a record matching operator tree is quantified. The disclosed architecture is based on leveraging a given set of matching and non-matching pairs of examples.

Examples: An example is a record pair belonging to R×S along with a label indicating whether or not the pair is considered a match. Let $\Delta^+$ denote the set of example matching record pairs and $\Delta^-$ denote the set of example non-matching pairs.

Let T(R, S) be an SJU operator tree over input relations R and S. Since it will be clear from the context, T(R, S) is also used to denote the result of executing T(R, S) on relations R and S.

Definition 2. The coverage of T(R, S) with respect to X ⊂ R×S is the fraction of records in $\Pi_{R.ID,S.ID}X$ that are also in $\Pi_{R.ID,S.ID}T(R, S)$. Given $0 \leq \beta \leq 1$, an operator tree T(R, S) is β-neg if the coverage of T(R, S) with respect to $\Delta^-$ is less than or equal to β. The quality of T(R, S) is its coverage with respect to $\Delta^+$.

Definition 3. (Operator tree design problem) Given $0 \leq \beta \leq 1$, the goal in the operator tree design problem is to find a β-neg operator tree T*(R, S) with the maximum quality.

A similarity join involves three different elements: (i) a set of similarity functions (e.g., edit similarity, hamming, etc.), (ii) the column sequences compared using the similarity functions, and (iii) the thresholds over the resulting similarity values in order to define the join predicates. For example, consider the set of edit and jaccard similarity functions, the columns {Name, Address} from two relations R and S, then a total of eight similarity functions is obtained: four corresponding to measuring edit similarity between all non-empty sub-sequence pairs {(⟨R.Name⟩, ⟨S.Name⟩), (⟨R.Address⟩, ⟨S.Address⟩), (⟨R.Name, R.Address⟩, ⟨S.Name, S.Address⟩), (⟨R.Address, R.Name⟩, ⟨S.Address, S.Name⟩)}; and four corresponding to measuring jaccard similarity between the same column combinations. Note that for certain similarity functions, the order of the attributes may not be important, or that the attributes may not be applied on certain combinations. In such cases, the number of relevant combinations would be less. It is assumed that all relevant combinations of similarity functions with column sequences are given. If not, a macro can easily be defined to generate all possible combinations.

Let there be D such combinations $f_1, \ldots, f_D$. Each $f_i$ (implicitly) associates a similarity function $g_j$ with a column sequence $A_k$. A similarity join is written as a conjunction of $f_i > \alpha_i$. Henceforth, each $f_i$, denoting a $g_j$ and $A_k$ association is loosely referred to as a similarity function.

Bounded SJU trees: Let $d \leq D$ and $K \geq 1$ be two integers. A restricted class is studied where each operator tree is allowed to be a union of at most K similarity joins, and where each similarity join may have at most d similarity function predicates. This restricted class of operator trees is denoted by SJU (d, K). Configuring a similarity join in SJU (d, 1) requires selection of (i) d out of D similarity functions and (ii) the corresponding thresholds. Configuring an operator tree in SJU (d, K) now requires configuration of the union of K such similarity joins. The number of these choices defines the SJU operator tree space.

Consider bounded operator trees for the following three intuitive reasons. First, the restriction is a mechanism to avoid "overfitting." A very large operator tree might be able to identify precisely all the matching pairs in a given set of examples quite well but it may not generalize well to the remaining pairs of tuples in R×S. Second, programmers are able to easily interpret and modify smaller operator trees. Third, smaller operator trees are usually more efficiently executable. Specifically, given two operator trees where one is a sub-tree of the second, then the first smaller operator tree is oftentimes more efficiently executable.

Definition 4. (Bounded operator tree design problem) Given $K \geq 1$, $d \leq D$, and $0 \leq \beta < 1$, the goal in the operator tree design problem is to find a β-neg operator tree T*(R, S) in SJU (d, K) with the maximum quality.

Focus herein is on the bounded operator tree design problem. Hence, operator tree design problem is used loosely to refer to the bounded variant.

Monotonicity: it is said that the ideal record matching program is monotonic with respect to a set $\{f_1, \ldots, f_D\}$ of similarity functions if, for any two pairs of records $(r_1, s_1)$ and $(r_2, s_2)$ (in R×S) such that $f_i(r_1, s_1) \geq f_i(r_2, s_2)$ for all $1 \leq i \leq D$, the fact that $r_2$ matches $s_2$ implies that $r_1$ also matches $s_1$.

Note that the monotonicity property only requires that any pair of matching records have a higher similarity value than a non-matching pair on at least one similarity function. It is empirically observed that this property is satisfied in most record matching scenarios. Record matching is monotonic with respect to a set of common similarity functions. It can be observed that if the ideal record matching program is monotonic with respect to $\{f_1, \ldots, f_D\}$, then there exists an SJU operator tree which correctly identifies all the matching records, and only those, in R×S.

The algorithm for identifying the best record matching operator tree will now be described. Since the problem described infra is NP-hard, approximation algorithms are developed. First, an algorithm is described for the restricted version of the problem where the operator tree can only contain one similarity join. The restricted operator tree design problem when K=1 is reduced to that of identifying the "best" d-dimensional hyper-rectangle in a D-dimensional "similarity space" induced by the similarity values between record pairs; each hyper-rectangle uniquely determines an operator tree with one similarity join. Next, the algorithm is described. The algorithm is then built upon to describe an approximation algorithm when the operator tree is allowed to contain K similarity joins. The algorithm for the restricted version with one similarity join forms the basis for applying known set coverage approximation techniques to the more general problem.

The maximum hyper-rectangle problem is defined and its equivalence with the operator design problem is shown when the problem is restricted to only one similarity join operator. Recall that each $f_i$ associates a similarity function $g_j$ with a column sequence $A_k$.

Definition 5. Similarity Space: Consider the D-dimensional space $[X_1, \ldots, X_D]$ where each dimension $X_i$ corresponds to a similarity value based on $f_i$ between record pairs in R×S. Each record pair $(r, s) \in \Delta^+ \cup \Delta^-$ maps to a point, $[f_1(r, s), \ldots, f_D(r, s)]$, in the similarity space. The mapped points corresponding to record pairs in $\Delta^+$ are tagged as positive (+) and those in $\Delta^-$ as negative (−) points. For ease of exposition, the set of points in the similarity space corresponding to matching and non-matching pairs is referred to as $\Delta^+$ and $\Delta^-$, respectively.

Figure 4:
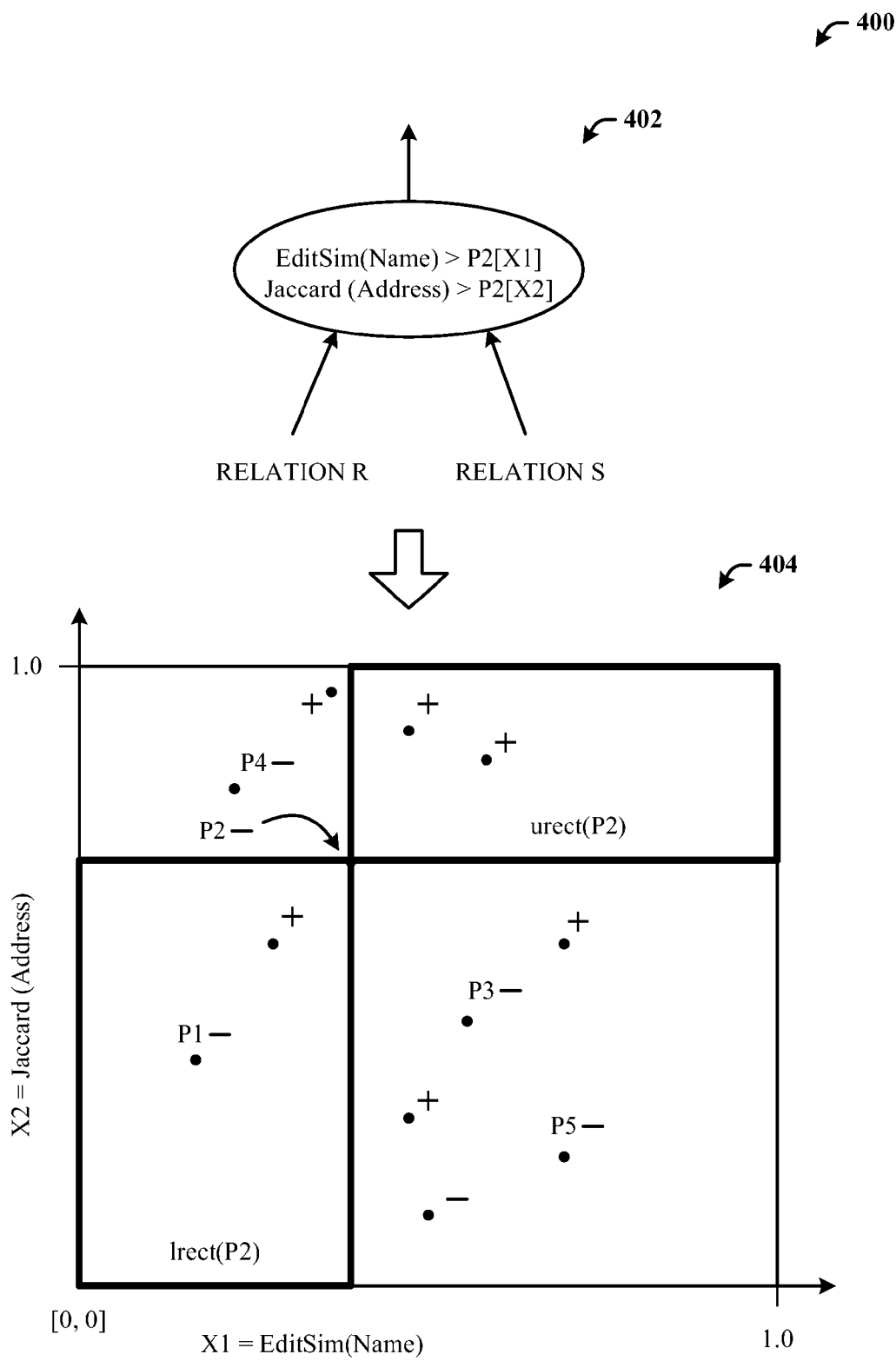
FIG. 4 illustrates an example set of mapped points along with positive and negative tags.

FIG. 4 illustrates an example set of mapped points along with positive and negative tags.

Definition 6. A point $p_1$ dominates a point $p_2$ if $p_1$'s values in all dimensions are greater or equal to that of $p_2$'s values, and at least on one dimension $p_1$'s value is greater than that of $p_2$. It is said that $p_1$ strongly dominates $p_2$ if $p_1[i] > p_2[i]$, $1 \leq i \leq D$. That is, $p_1$'s values are strictly greater than that of $p_2$ on each dimension.

For reasons which will be clear later, a point is required in which every point in the similarity space strongly dominates. Since all similarity values are non-negative, use $\overline{-\epsilon}(X_i = -\epsilon, 1 \leq i \leq D)$ for this point.

Definition 7. A point p in the similarity space defines the following two hyper-rectangles. The lower rectangle lrect(p) of p is the set of points strongly dominated by p. This is called lrect(p) because it is the set of all points inside the hyper-rectangle defined by the corners $\overline{-\epsilon}$ and p. The upper rectangle urect(p) of p is the set of all points strongly dominating p and urect(p) is set of points inside the hyper-rectangle defined by corners p and $\overline{1}$ ($X_i = 1$, $1 \leq i \leq D$). Given a point p urect(p) is d-dimensional if at least d attribute values of p are non-negative, i.e., at most d hyper-planes ($X_i > p[i]$) are required to define urect(p). A hyper-rectangle containing less than or equal to $\beta \cdot |\Delta^-|$ negative points is β-neg rectangle. Likewise, the coverage of a hyper-rectangle urect(p) denotes the fraction of positive points in urect(p).

The term rectangle is also loosely used to mean a hyper-rectangle when the dimensionality is greater than 2. FIG. 4 illustrates the lower and upper 2-dimensional rectangles, lrect (P2) and urect(P2), respectively. The problem of designing (from examples) the best β-neg operator tree with one similarity join now reduces to that of identifying a d-dimensional hyper-rectangle with the maximum number of positive points but at most $\beta \cdot |\Delta^-|$ negative points.

Definition 8. Maximum rectangle problem: Given an integer $d \leq D$ and a constant $0 \leq \beta \leq 1$ and sets $\Delta^+$ and $\Delta^-$ of positive and negative points, respectively, in a D-dimensional space, find a point a such that urect($\overline{\alpha}$) is a d-dimensional β-neg hyper-rectangle whose coverage with respect to $\Delta^+$ is maximum.

Consider the rectangle urect($[\alpha_1, \ldots, \alpha_D]$) and the operator tree T with the similarity join predicate $\hat{}_{i=1}^D f_i(R.A_i, S.A_i) > \alpha_i$. Each record pair in the result of T maps to a point in the rectangle. FIG. 4 illustrates the equivalence of the problems of finding the best 0-neg operator tree and that of finding the best 0-neg hyper-rectangle in two dimensions when the similarity functions are edit distance similarity on the Name column and Jaccard similarity on the Address column. The tree 402 shows an operator tree T with one similarity join while the rectangle 404 shows a rectangle whose bottom left corner is (P2[X1], P2[X2]). The rectangle urect(P2) in 404 consists of all the points corresponding to record pairs in the result of tree 402. Note that urect(P2) is not the optimal solution. The intuition extends to the case when similarity joins are only allowed to contain at most d similarity functions, and is formalized below.

LEMMA 1. The maximum hyper-rectangle problem is equivalent to that of finding the best operator tree with one similarity join.

With respect to maximum hyper-rectangle, a goal here is to identify $[\alpha_1, \ldots, \alpha_D]$ such that urect($[\alpha_1, \ldots, \alpha_D]$) is the best d-dimensional β-neg rectangle. Such a rectangle uniquely corresponds to the similarity join with predicate $\wedge_{i=1}^{D}$ $f_i(R.A_k, S.A_k) > \alpha_i$, where only d of the $\alpha_i$'s have value $\geq 0$. Recall that each $f_i$ associates a similarity function $g_j$ with a column sequence $A_k$. Start by describing the algorithm for the 0-neg rectangle problem (i.e., β=0) with d=D. This constraint is then relaxed and β>0 is allowed. In this section, it is assumed that the numbers of examples in $\Delta^+$ and $\Delta^-$ can fit in main memory.

Figure 5:
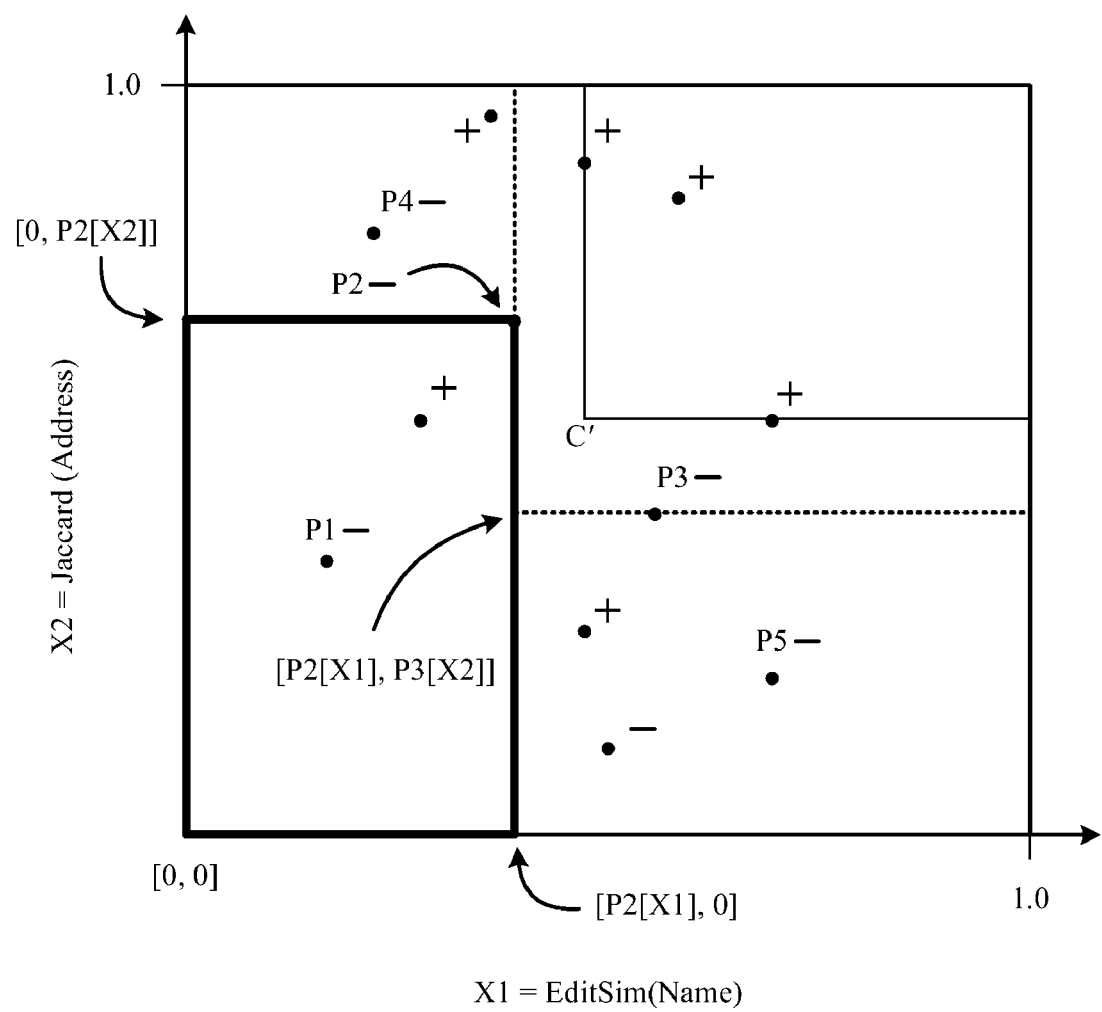
FIG. 5 illustrates an example of successively eliminating sub-regions in a similarity space of two dimensions.

A recursive divide and conquer strategy is adopted, and regions are successively eliminated in the similarity space which cannot contain the bottom left corner of a 0-neg rectangle. The problem is then recursively solved in the remaining smaller sub-regions. FIG. 5 illustrates an example of successively eliminating sub-regions in a similarity space of two dimensions. Consider the point P2. First observe that lrect(P2) cannot contain the bottom left corner of any 0-neg rectangle because any such rectangle contains the negative point P2. In fact, any negative point defines such a region which can be eliminated from further consideration. The remaining region is the union of two new sub-regions: urect([P2[X1], 0]) and urect([0, P2[X2]]). Note that these new regions correspond to translating the origin to [P2[X1], 0] and [0, P2[X2]], respectively. Now recurse over each one of these two regions for determining the best rectangle. While processing urect(P2[X1], 0]), choose the negative point P3. One of the newer regions is the rectangle urect([P2[X1], P3[X2]]) which contains only positive points, and hence, is a valid rectangle. Among all such valid rectangles encountered during the recursive traversal of the algorithm, the rectangle with the highest number of positive points is chosen.

As illustrated above, each of the negative points defines a candidate lower rectangle which can be eliminated. The number of candidate lower rectangles for elimination can be further reduced due to the following observation.

Skyline: Conventionally defined, the skyline of a set of points contains all points which do not "dominate" each other. For the example in FIG. 5, the points P2 and P3 are on the skyline of negative points, while P1 is not, because P1 is dominated by both P2 and P3. The skyline of the negative points $\Delta^-$ is referred to as the negative skyline $S^-$.

PROPERTY 1. Let p be a point in $S^-$. Then, for any point p' in lrect(p), urect(p') cannot be a 0-neg hyper-rectangle.

For example, the rectangle lrect(P2) corresponding to the negative skyline point P2 in FIG. 5 cannot contain the bottom left corner p' of any 0-neg rectangle urect(p'). Among all negative skyline points, choose one point p uniformly at random, eliminate the rectangle lrect(p), and then recurse on the new upper rectangles.

Stopping Condition: During any given recursive call a sub-region is explored which is the upper rectangle urect(O) of some point O in the similarity space. When an upper rectangle is "valid" (i.e., it does not contain any negative skyline point, and hence, no negative point), stop recursing on this sub-region. For the example in FIG. 5, choose P4. Generate two new upper rectangles urect([0, P4[X2]]) and urect([P4[X1], 0]), respectively. The first upper rectangle is valid since it contains only positive points, and recursing is not performed.

The above approach can be extended even when requiring the final rectangles to be d-dimensional for some d<D. If the number d' of non-negative dimension values of O is greater than d, then urect(O) cannot contain a valid d-dimensional rectangle, because at least d' hyper-planes are required to describe any rectangle contained in urect(O). Therefore, recursing is stopped. This intuition is formalized below.

PROPERTY 2. Let O be a point, and p be any point which strongly dominates O. The dimensionality of urect(O) is a lower bound of the minimum dimensionality of urect(p).

FIG. 6 illustrates the algorithm 600 for determining the maximum 0-neg rectangles. The overall algorithm 600 consists of three steps. First, the negative skyline is built. The second main step is the QuickCorners algorithm for identifying the best corner. The third step adjusts the corner of the rectangle returned by QuickCorners.

Step 1. Negative skyline identification: Identify the skyline $S^-$ of all negative points. Any of the known skyline identification algorithms can be used for this purpose. In one implementation, an algorithm based on nested loop joins can be used.

Step 2. QuickCorners: Recursively explore the similarity space. Each call to the recursive algorithm takes a corner C which defines a candidate hyper-rectangle urect(C). Initially, start with the corner $\overline{-\epsilon}$, where each attribute value is set to the lowest boundary value. Given a corner C, first check whether or not to stop recursive exploration. Exploration can stop when finding a valid rectangle. If a valid hyper-rectangle is found, the current QuickCorners call returns the number of positive points contained in urect(C) as its quality. Otherwise, if it is determined that the urect(C) cannot contain a valid rectangle, then return. The stopping conditions are described after the sub-region enumeration. The algorithm 600 is listed here.

---

BestHyperRectangle($\Delta^+$, $\Delta^-$, d)
Initialization: C = [−ϵ, . . . , −ϵ] where ϵ > 0 is a small constant.
(1) Build the skyline $S^-$ of negative points $\Delta^-$
(2) QuickCorners($\Delta^+$, $\Delta^-$, $S^-$, ref C, d, 0)
(3) AdjustCorner(ref C, $\Delta^+$)
QuickCorners($\Delta^+$, $\Delta^-$, $S^-$, ref C, d, d')
/* Stop conditions */
(1) if(d' > d) return
(2) If ValidCorner (C, $S^-$)
        return v = Coverage(urect(C), $\Delta^+$)
/* Recursion */
(3) Else, randomly pick a point p ∈ $S^-$ which strongly dominates C.
(4) v* = 0; C* = null
(5) foreach dimension i,
        C' = [C [1], . . . , p[i], . . . , C[D]]
        d" = d'
        if (C[i] == −ϵ) d" = d' + 1
        v = QuickCorners($\Delta^+$, $\Delta^-$, $S^-$, C', d, d")
        if (v > v*) then v* = v; C* = C' endif
    end foreach
(6) C = C*
ValidCorner(C, $S^-$)
(1) foreach p ∈ $S^-$
(2)     if p strongly dominates C
            return false
(3) return true
AdjustCorner(ref C, $\Delta^+$)
foreach dimension i
        C'[i] = MIN {p[i] such that p ∈ $\Delta^+$ strongly dominates C}
end foreach $$C = \frac{C + C'}{2}$$

---

Step 2.1. New urect enumeration: If not stopping, urect(C) must contain at least one negative skyline point which strongly dominates C. (Otherwise, from Property 1 it is known that urect(C) is a valid rectangle and the process would have stopped.) Among all such strongly dominating negative skyline points, choose a point p uniformly at random and identify new sub-regions of urect(C) to recurse on. The new sub-regions are obtained by eliminating lrect(p) from urect (C) such that the union equals urect(C)−lrect(p). Consider the upper rectangles of new corners $C_1, \ldots, C_D$ defined as follows: $C_i$ is obtained by replacing C[i] with p[i]; on all other dimensions j≠i, $C_i$[j]=C[j]. Intuitively, these new upper rectangles are obtained by translating the original corner C along each of the dimensions until p. Then call QuickCorners on each new corner.

By construction, the point p cannot strongly dominate any of the new corners $C_1, \ldots, C_D$. Therefore, the number of dominating negative skyline points in each urect($C_i$) is less than that of urect(C) by at least one. Thus, each call to Quick-Corners makes definite progress by eliminating at least one negative skyline point. Therefore, the algorithm terminates.

Step 2.2. Stopping and Validation Check: Following is a description of the conditions for stopping and for determining whether or not a valid hyper-rectangle urect(C) is found. The two conditions when a stop can be made are (i) a valid hyper-rectangle is found in that there is no negative point which strongly dominates C (Property 1), and (ii) there can be no valid hyper-rectangle in d dimensions, i.e., d'>d from Property 2.

Step 3. Corner Adjustment: The rectangle returned by the maximum rectangle algorithm touches the negative points and may be far from the positive points. Once the best valid rectangle has been identified, analyze the distribution of the positive points and "move" the rectangle to be closer to the positives. After finding the best hyper-rectangle urect(C) its corner is adjusted such that the adjusted rectangle is between the positive points and negative points.

First find the corner C' as follows. On each dimension $X_i$ in the relevant subset of d dimensions, C[i] is set to be the minimum attribute value among all positive points in urect (C). Note that urect(C') contains all positive points in urect(C) but there does not exist another point C" which (i) dominates C' and (ii) contains all positive points in urect(C). Intuitively, C' defines the corner until which C can be pushed towards the positive points without reducing the coverage of urect(C) with respect to $\Delta^+$.

The new adjusted corner $C_{new}$ is the average of C and C'. Note that other adjustment policies may be easily adopted.

In FIG. 5, urect([P2[X1], P3[X2]]) would be returned by QuickCorners, and, urect(C') is the minimal rectangle enclosing all positive points in urect([P2[X1], P3[X2]]). The corner is adjusted to be the average of [P2[X1], P3[X2]] and C'.

In the QuickCorners algorithm, it is further possible to avoid processing a rectangle urect(C) for the best rectangle when it is known that any rectangle urect(C') contained in urect(C) would have a quality less than that of the current best hyper-rectangle. An upper bound on the quality of any rectangle contained in urect(C) is the total number of positive points in urect(C). Thus, C can be pruned to not be useful when the upper bound on maximum quality is less than the current best quality. It can now be stated that the QuickCorners algorithm terminates and its complexity analyzed.

THEOREM 2. The QuickCorners algorithm terminates and returns the maximum d-dimensional hyper-rectangle.

Complexity of QuickCorners: While processing each corner C, examine each positive point to check whether C is valid. Each negative skyline point can then be examined to pick a point at random for recursing. In the new rectangles, the number of negative skyline points strongly dominating the new corner is at most $$\frac{D-1}{D}|S^-|.$$

When D is small, the reduction is significant. When D≦3, the expected complexity is $O(|\Delta^+|+|S^-|)^{(1+\log|S^-|)}$.

For higher values of D, the reduction in problem size depends on the distribution of negative skyline points. The above analysis extends if assuming that all dimensions are identically and independently distributed. Empirically, it can be demonstrated that the QuickCorners algorithm is efficient even for large D values (e.g., up to 30) under the typical scenarios when d, the number of similarity functions allowed in similarity joins, is small. Execution times can be much larger than training times for very large datasets.

Figure 7:
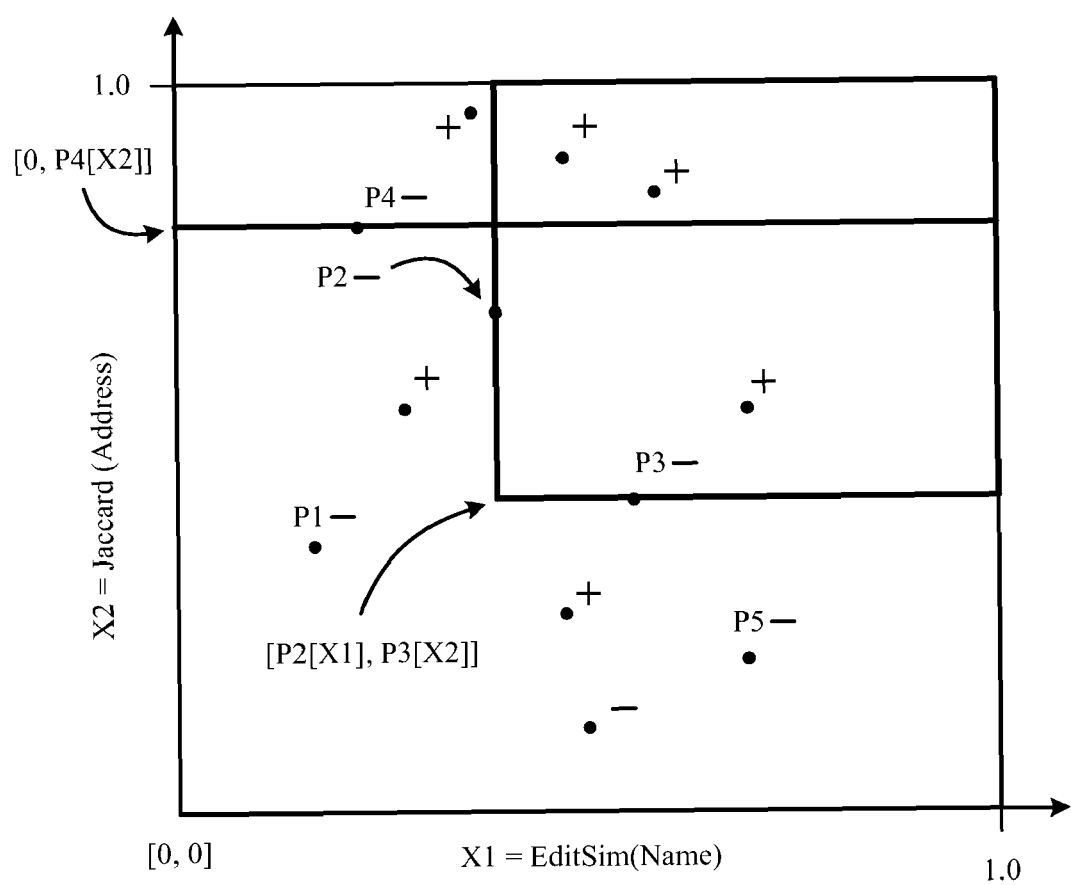
FIG. 7 illustrates that several rectangles may have to be used to improve the coverage with respect to record matches.

As described supra, a single hyper-rectangle equivalently, operator tree may not be able to cover all the positive points. FIG. 7 illustrates that several rectangles 700 may have to be used to improve the coverage with respect to $\Delta^+$. Described now is an algorithm to identify a good operator tree (in SJU (d, K)) with at most K similarity joins.

First observe that this problem is similar to a conventional set coverage problem. Given a collection of sets S and an integer K, the goal in the set coverage problem is to pick K sets $\{S_1, \ldots, S_K\}$ such that the total number of elements in $\cup_{i=1}^{K} S_i$ is maximized. In the current problem, by viewing each 0-neg hyper-rectangle as a set in the collection of sets, the problem of choosing K (0-neg) hyper-rectangles such that their coverage with respect to $\Delta^+$ is maximized reduces to that of choosing the best K sets. This relationship is the intuition behind the following result.

THEOREM 3. The operator tree design problem is NP-hard.

A greedy algorithm can be adapted for the set coverage algorithm. The algorithm can be exploited to identify the best hyper-rectangle over a given set of examples, and avoid the enumeration of all valid hyper-rectangles, which can be very large. The best rectangle is greedily picked, the positive (and negative) points contained in this rectangle are removed, and the procedure is repeated on the remaining examples. When K rectangles have been picked or when all positive examples are removed, the process stops. It can now be shown that this greedy strategy yields a good solution, which is within a factor of the optimal solution. The proof follows from the conventional set coverage problem.

LEMMA 4. Given K, the greedy algorithm picks an operator tree whose coverage with respect to $\Delta^+$ is within a factor of (1−1/e) of the optimal 0-neg operator tree containing a union of K similarity joins.

Often, allowing rectangles to contain a few negative points may significantly improve the coverage of the positive points. In this case, the overall outline of the algorithm remains the same, except the validation. The outline of the modified validation function follows. The intuition is that a rectangle urect (C) is valid if the number of negatives it contains is less than or equal to $\beta|\Delta^-|$.

| ValidCornerBeta(C, $\Delta^-$, β) |
|---|
| (1) Initialization: P__ = 0; B = β · $|\Delta^-|$ |
| (2) foreach p ∈ $\Delta^-$ |

-continued

| ValidCornerBeta(C, Δ⁻, β) |
|---|
| (3) if p strongly dominates C |
|     P_ ++ |
|     if P_ > B return false |
|   endif |
| (4) return true |

Now consider a more general class of operator trees, those containing attribute value transformation operators, which are referred to as rename operators, in addition to similarity join and the union operators.

For instance, the operator tree 300 in FIG. 3 illustrates a tree with all of these operators. A rename operator is beneficial for record matching if pairs of matching records become closer, while non-matching pairs move farther away according to one or more similarity functions. The following description first characterizes the rename operators which can be included in the framework, gives a few example rename operators, and then describes the algorithm.

Properties of rename operators: Any unary operator p that takes a threshold parameter θ as input and which (i) produces exactly one output tuple for each input tuple, and (ii) commutes with the union operator can be implemented as a new rename operator in the disclosed framework. That is, applying the operator to a relation R is equivalent to applying the operator to each individual record r∈R and then taking the union over the results of each application.

Example rename operators: It will now be illustrated that several useful data cleaning operations can be instantiated from the rename operator, thus demonstrating the generality of its abstraction.

Fuzzy Lookup Operator: Consider the use of domain-specific lookup tables for standardizing attribute values. For example, State values in USA may be abbreviated to 2-character codes based on a translation table obtained from the US postal service department. However, due to errors the input values may not match exactly with the non-abbreviated state names. The fuzzy lookup operator may be used in such scenarios.

Given an input relation R, the lookup table L, the set of attributes A, a similarity function $f$ over A, and a threshold parameter θ, the fuzzy lookup operator joins for each record r∈R, the value r[A] with the most similar value l[A] if $f(r[A], l[A])>θ$, where l∈L. When multiple L[A] values have the same highest similarity value, any consistent tie-breaking mechanism may be adopted. Note that the fuzzy lookup operator may be viewed as a similarity join operator followed by a Top-1 operator. These can be encapsulated together so that the encapsulation (i) can be implemented as a rename operator, and (ii) can be implemented more efficiently.

Column Segmentation and Concatenation: Consider an operator which takes an attribute value R.A and segments it into constituent attribute values $A_1, \ldots, A_k$ based on regular expressions. Such an operator is useful for identifying target attribute values across a variety of domains: addresses, media databases, etc. For example, commercial address cleansing tools rely heavily on this operator, which in such context is called "parsing". The concatenation operator which is the inverse of segmentation concatenates multiple columns together. Note that both these operators modify the schema of the input relations. Even though the discussion herein assumes, for reasons of clarity, that schema is not modified, it is noted that the disclosed approach is sufficiently general to handle the segmentation and concatenation operators.

FD-Correction Operator: The FD-correction operator exploits reference tables and the knowledge of functional dependencies to correct missing and incorrect values in a record, even when the functional dependency is soft in that it holds for a large subset of the data, or when there is not a perfect reference table.

The functional dependency Zip→City is an example of a soft functional dependency because a few zip codes may actually be associated with multiple cities. In a group of records sharing the same zip value, if a large percentage (e.g., greater than a threshold above 50%) of City values have the same City value, the City values of other records in the group can be renamed to this dominant value. In order to avoid conflicts while determining the dominant value in a group, the threshold on the majority percentage is restricted to be above 50%. The FD-Correction operator can in fact be generalized to that of applying high confidence (e.g., greater than 50%) association rules.

Introducing rename operators into the design space generalizes the class of operator trees. Any operator tree which is a union of "rename-join" blocks belongs to the generalized class. Each rename-join (RJ) block is an operator tree over both input relations involving a series of rename operators followed by one similarity join. An example is shown on the right side in FIG. 3. This class of operator trees is called the RJU class.

A rename operator may be applied to both input relations R and S, or to only one of R or S. For the sake of simplicity, only the restricted case is described where the rename operator is applied to both input relations. The disclosed techniques can be applied to the more general variants.

Since the class of thresholded rename operators is considered, a decision needs to be made as to whether or not to include a rename operator in an operator tree, and also determine the threshold value. For ease of exposition, the restricted case where the thresholds for renames are fixed is first considered.

Consider a rename operator ρ. The benefit of a rename operator depends on the operator tree following it. Consider both options: design the best similarity join preceded by ρ and not preceded by ρ, and choose the better of the two operator trees. This approach could be inefficient if the number of rename operators is large. A heuristic is adopted where a similarity join is first designed, and then evaluated whether or not preceding it with ρ applied to both input relations would improve the quality. The rename operator ρ with the highest benefit value $benefit_{T(R,S)}(\rho, \Delta)$ is chosen, which is defined below. This algorithm can be generalized to also iterate over various alternate threshold values, and choose the best one.

Figure 8:
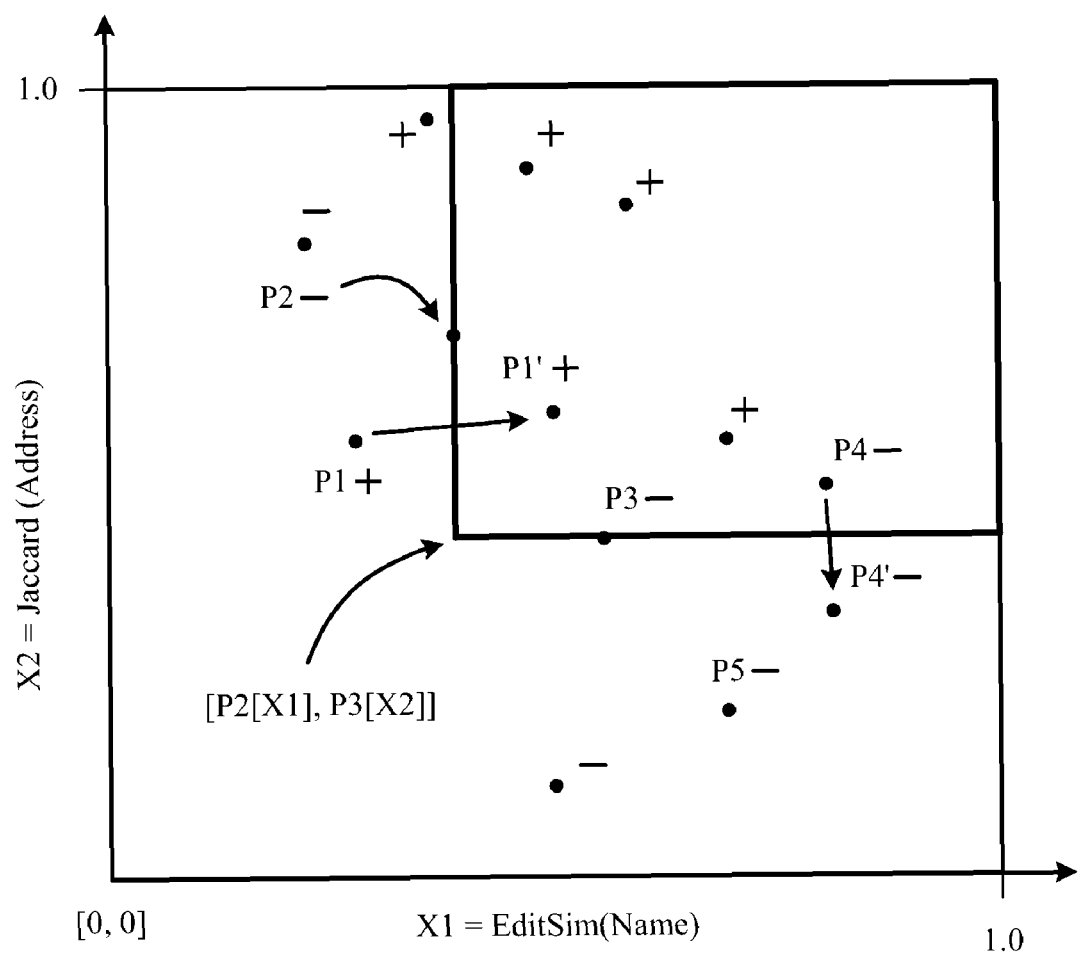
FIG. 8 illustrates a renaming example where the benefit is two.

Let ρ precede an operator tree T with one similarity join operator. Consider the rectangle equivalent to T in the similarity space. A measure of benefit of ρ is the sum of the increase in the number of positive points in the rectangle and the decrease in the number of negative points. FIG. 8 illustrates a renaming example where the benefit is 2. The positive point P1 moves inside the rectangle (urect(P2[X1], P3 [X2])) and the negative point P4 moves outside it. This intuition can in fact be extended to any operator tree, as follows.

DEFINITION 3. Let ρ(Δ) denote the set of transformed examples where the rename operator is applied to each example in x∈Δ, on both projections x[R] and x[S] of the example. Formally, the benefit of ρ with respect to T over Δ is defined as:

$$benefit_{T(R,S)}(\rho, \Delta) = \{Coverage(T(R, S), \rho(\Delta^+)) - Coverage(T(R, S), \Delta^+)\} + (Coverage(T(R, S), \Delta^-) - Coverage(T(R, S), \rho(\Delta^-)))\}.$$

The above discussion focuses on the addition of a rename operator before an operator tree with only a similarity join. However, the procedure straightforwardly generalizes to an operator tree which is any member of the RJU class. Thus, more rename operators can be greedily added if the operators improve the overall quality.

Implementing RJU Class: The rename operators that are considered herein, for example, fuzzy lookup, column segmentation, and FD-correction have efficient implementations. By definition, the rename operators commute over unions. Therefore, a sequence of these rename operators can be efficiently implemented using the pull-based get next interface. The similarity joins are implemented using the same get next interface, and if the input relations are very large the intermediate relations can be spooled to disk. A significant number of efficient similarity joins algorithms are developed earlier for a broad class of similarity functions. These algorithms can be adopted in this framework to efficiently and scalably implement the RJU operator trees.

Now described are (i) extensions to handle large example sets, (ii) the variants of the operator tree design formulation, and (iii) the issue of gathering examples.

A sampling-based technique is provided for dealing with a large number of examples. This strategy also sets the ground for evaluating the quality of the disclosed algorithm over real data where the ground truth as to which record pairs match is not available.

The idea is that running the algorithm on a uniform random sample of examples would return high quality operator trees. The difference in quality between the result over the sample and that over the entire example set can be probabilistically bound (using Chernoff bounds). The intuition is similar to that of estimating selectivities of predicates using uniform random samples.

LEMMA 5. Let $D=D_++\cup D_-$ be a set of examples. Let $S=\Delta^+ \cup \Delta^-$ be a uniform random sample of D, and T be an operator tree in the RJU class. Let the coverage of T with respect to $\Delta^+$ and $\Delta^-$ be $\beta_+$ and $\beta_-$ respectively. Then the coverages, denoted $X_+$ and $X_-$, of T with respect to the original example sets $D_+$ and $D_-$ are with a high probability close to $\beta_+$ and $\beta_-$ respectively. For constants $\delta_1>0$ and $\delta_2>0$, the following bounds are:

1. $P(X_+ < (1-\delta_1)\beta_+|D^+|) < e^{\frac{-\beta_+|D^+|\delta_1^2}{2}}$

2. $P(X_- > (1+\delta_2)\beta_-|D^-|) < \left(\frac{e^{\delta_2}}{(1+\delta_2)^{(1+\delta_2)}}\right)^{\beta_-|D^-|}$ Variants of the operator tree design problem that are potentially useful in several scenarios, and would greatly benefit users of interactive data cleaning frameworks are now described.

Constrained Coverage: The dual formulation for the record matching query design problem is to find the best operator tree T*(R, S) which minimizes the coverage of T*(R, S) with respect to $\Delta^-$ subject to the constraint that the coverage with respect to $\Delta^+$ is greater than a constant $\alpha$.

The algorithm can still be applied for identifying the best hyper-rectangle, and the greedy algorithm for the union of similarity joins. Stop when the desired positive coverage thresholds are met. Or, return, when unable to meet the specified coverage threshold with respect to $\Delta^+$.

Constrained Structure: Consider an incremental modification scenario where the domain expert has already designed an operator tree (either based upon a previous set of examples or upon experience) and wants to adjust it to fit a new or a modified set of examples. The goal here is to build an operator tree which is structurally the same or very similar to an input operator tree. Note that the language for specifying such structural constraints can itself be fairly general. Here, only the case where a user specifies an operator tree skeleton and wants to determine the best threshold parameters is considered. It is also shown how such functionality can be used in conjunction with the complete operator tree design functionality to derive "similar" operator trees.

An operator tree skeleton $T_{skeleton}$ is an operator tree where the threshold parameters of the similarity joins are left unspecified as free variables. Formally, given an operator tree $T_{skeleton}(R, S)$ and sets of examples $\Delta^+$, $\Delta^-$, and a constant $0 \leq \beta < 1$, the structure constrained operator tree design problem is to determine the best threshold parameter settings for similarity joins in $T_{skeleton}(R, S)$ which maximize the coverage with respect to $\Delta^+$ subject to the constraint that the coverage with respect to $\Delta^-$ is less than or equal to $\beta$.

Using the above functionality, slightly modified operator trees can be built by piping the "residual" examples in $\Delta^+ \cup \Delta^-$ to the (original) record matching operator tree design problem. The residual example set is the set of all examples which are not in the result of $T^*_{skeleton}$. That is, $T^*_{skeleton}$ categorizes these examples to be non-matches. If there is a significant number of matching pairs from $\Delta^+$ in the residual set, then we may determine a new operator tree $T^*_{residual}$ over the residual set. This new operator tree $T^*_{residual}$ can be unioned with $T^*_{skeleton}$.

Suppose it is desirable to add to a small set of new labeled examples in order to obtain more accurate operator trees. Instead of asking a programmer to label a random set of record pairs in R×S, active learning approaches in machine learning can be adopted. The idea is to identify a set of examples which are likely to result in the best accuracy improvement over the current operator tree.

The general approach is to identify examples which are close to the "border" separating positive from negative points. Intuitively, these are the points where the operator tree (or the model) is the most unsure of while classifying as matches or non-matches. In this case, this border is easy to identify and corresponds to the planes that define the rectangles equivalent to the similarity joins. Therefore, the initial operator tree can be executed and a few record pairs sampled in the output that are very close to these planes. The programmer can then be asked to label the samples as matches or non-matches. These newly labeled examples can then be added to the original set and redesign the operator tree.

Figure 9:
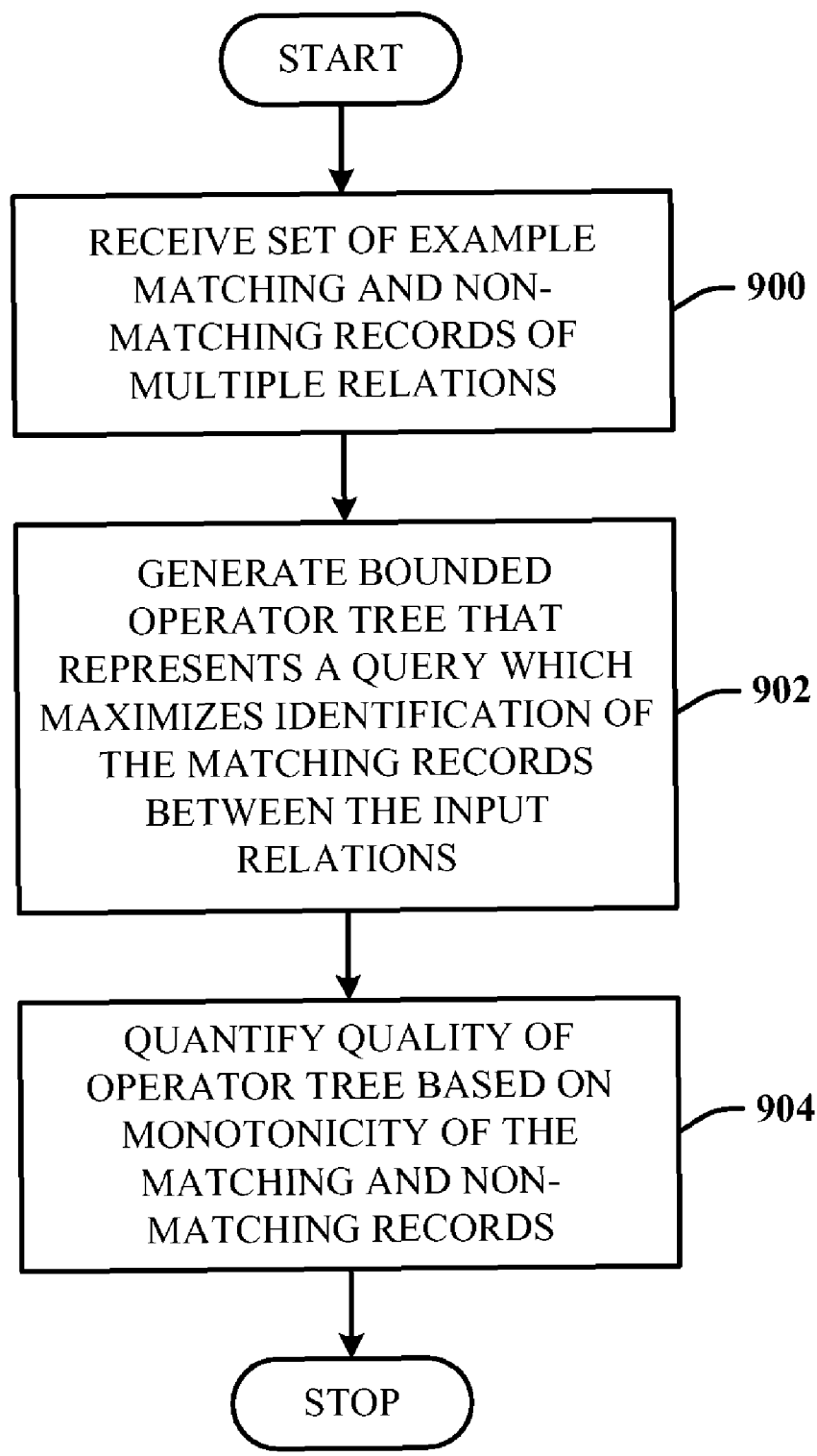
FIG. 9 illustrates a method of providing a query based on example-driven record matching.

FIG. 9 illustrates a method of providing a query based on example-driven record matching. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 900, an example set of matching records and non-matching records of multiple relations is received. At 902, a bounded operator tree that represents a query is generated which maximizes identification of the matching records between the relations. At 904, the quality of the operator tree is quantified based on monotonicity of the matching and non-matching records.

Figure 10:
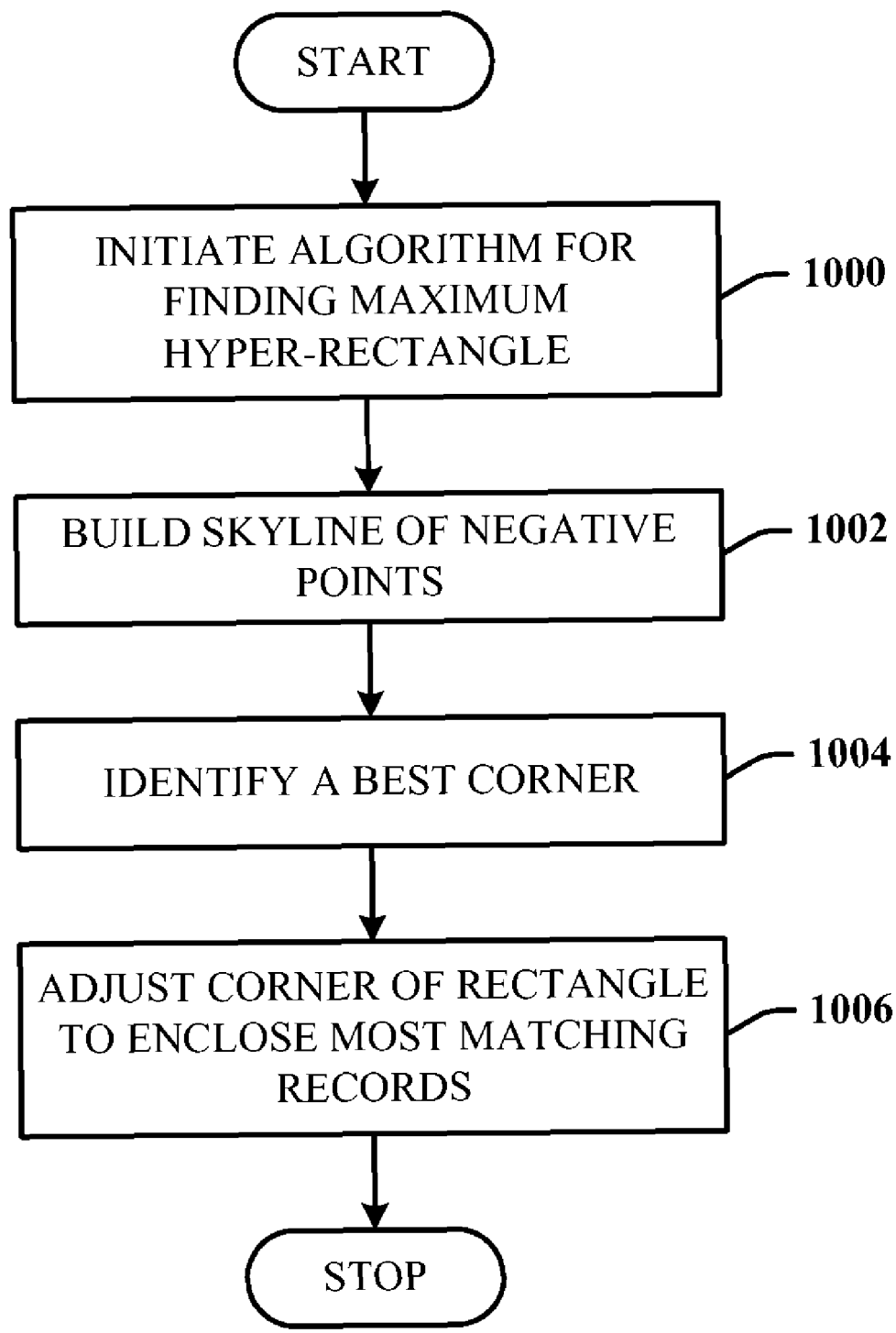
FIG. 10 illustrates a method of finding a maximum hyper-rectangle.

FIG. 10 illustrates a method of finding a maximum hyper-rectangle. At 1000, an algorithm is initiated to find a maximum hyper-rectangle. At 1002, a skyline of negative points is built. At 1004, a best corner is identified. At 1006, the corner is adjusted to enclose the most matching records.

Figure 11:
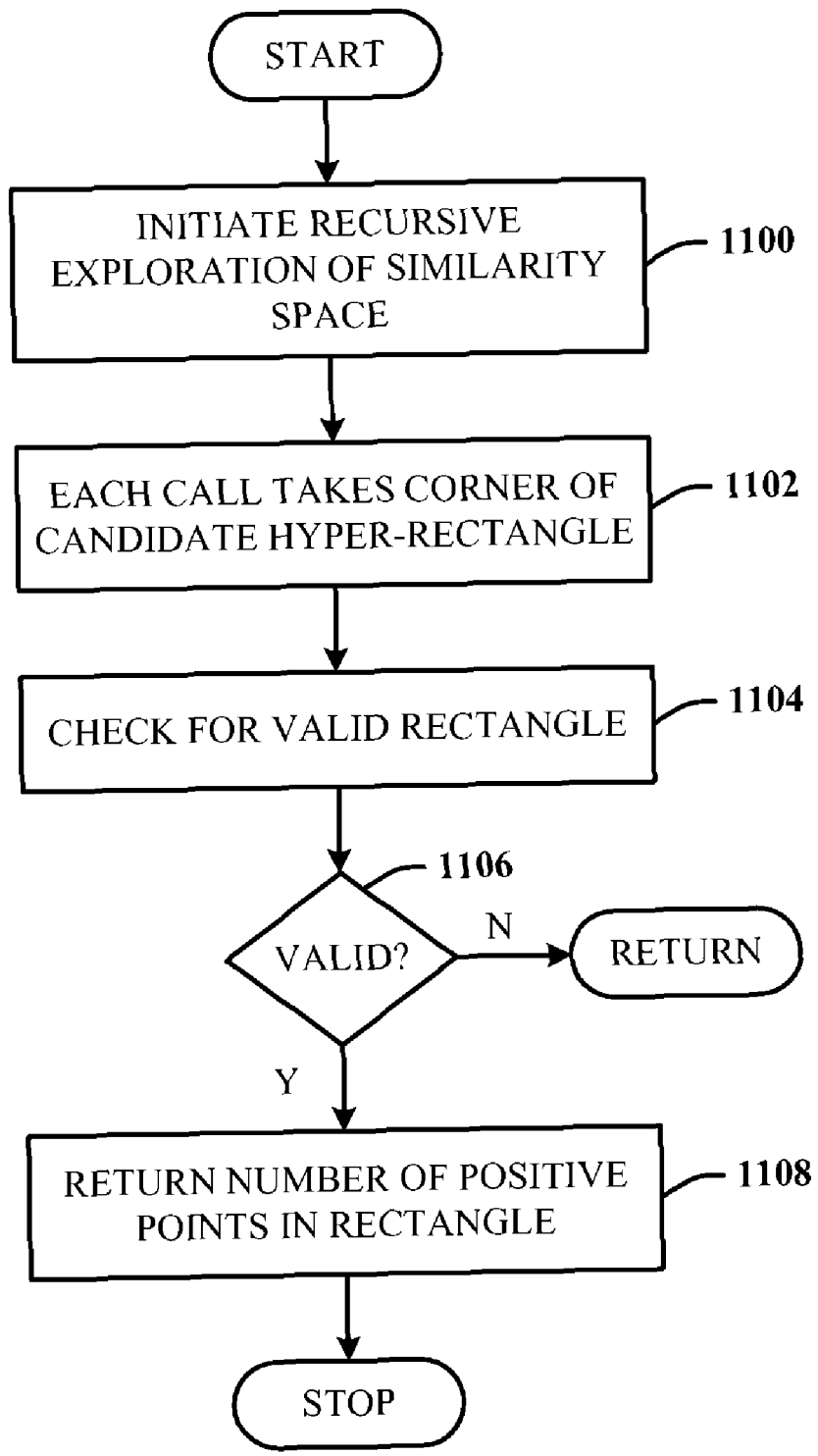
FIG. 11 illustrates a method of finding corners in candidate hyper-rectangles.

FIG. 11 illustrates a method of finding corners in candidate hyper-rectangles. At 100, recursive exploration of the similarity space is initiated. At 1102, each call takes a corner of a candidate rectangle. At 1104, a check is made for a valid rectangle. At 1106, if valid, flow is to 1108 to return the number of positive points (or matches) in the rectangle. Alternatively, at 1106, if not valid, the process returns.

Figure 12:
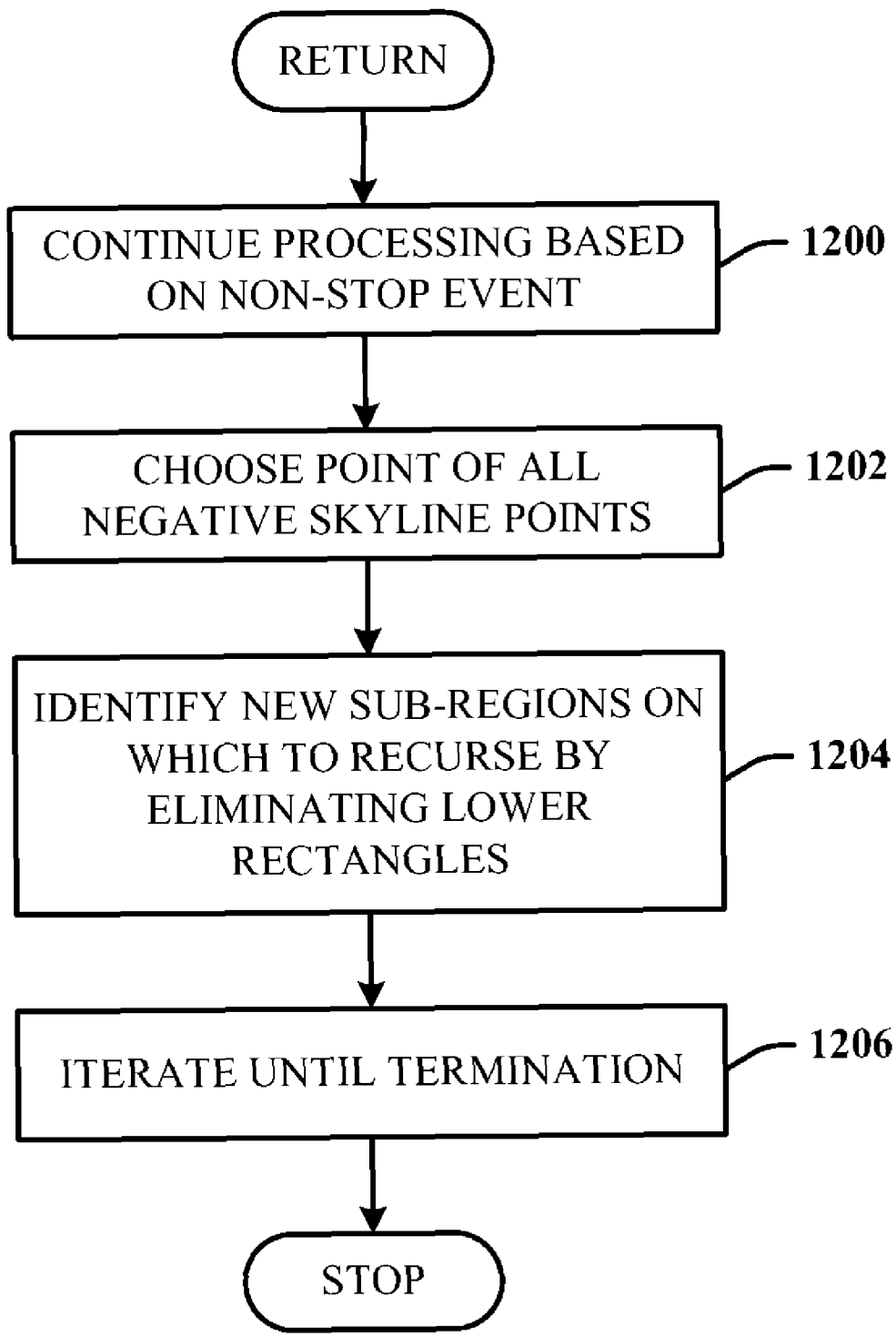
FIG. 12 illustrates a method of processing when the rectangle is not valid.

FIG. 12 illustrates a method of processing when the rectangle is not valid. At 1200, processing continues based on a non-stop event. At 1202, choose a point of all the negative skyline points. At 1204, identify new sub-regions on which to recurse by eliminating lower rectangles. At 1206, iterate until termination.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
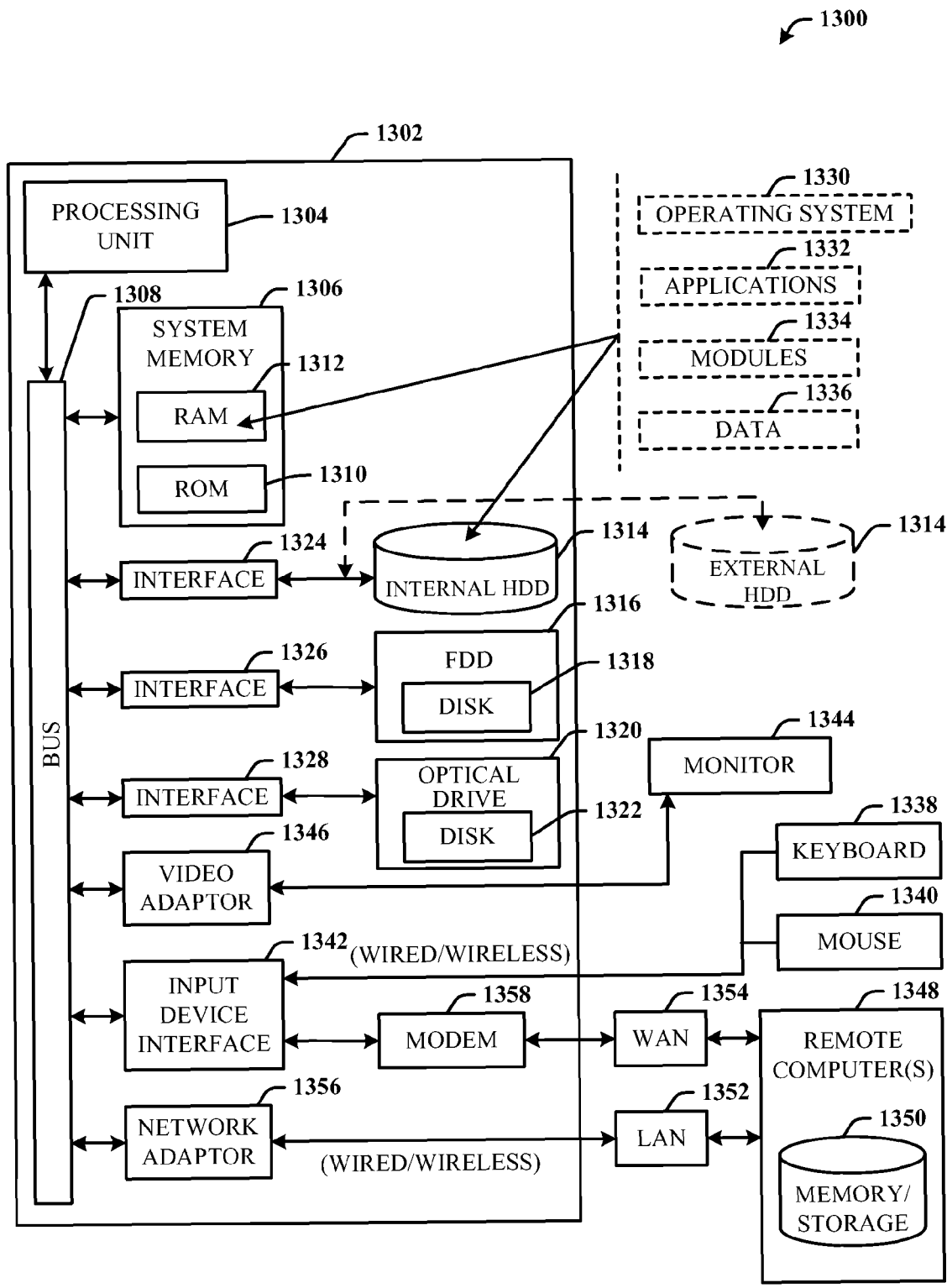
FIG. 13 illustrates a block diagram of a computing system operable for example-driven generation of record matching queries.

Referring now to FIG. 13, there is illustrated a block diagram of a computing system 1300 operable for example-driven generation of record matching queries. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302, the computer 1302 including a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1312, including an operating system 1330, one or more application programs 1332, other program modules 1334 and program data 1336. The one or more application programs 1332, other program modules 1334 and program data 1336 can include the example set 104, input component 102 and modeling component 108 of FIG. 1, and the quality component 202 of FIG. 2.

All or portions of the operating system, applications, modules, and/or data can also be cached in the RAM 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the local network 1352 through a wire and/or wireless communication network interface or adapter 1356. The adaptor 1356 may facilitate wire or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 14:
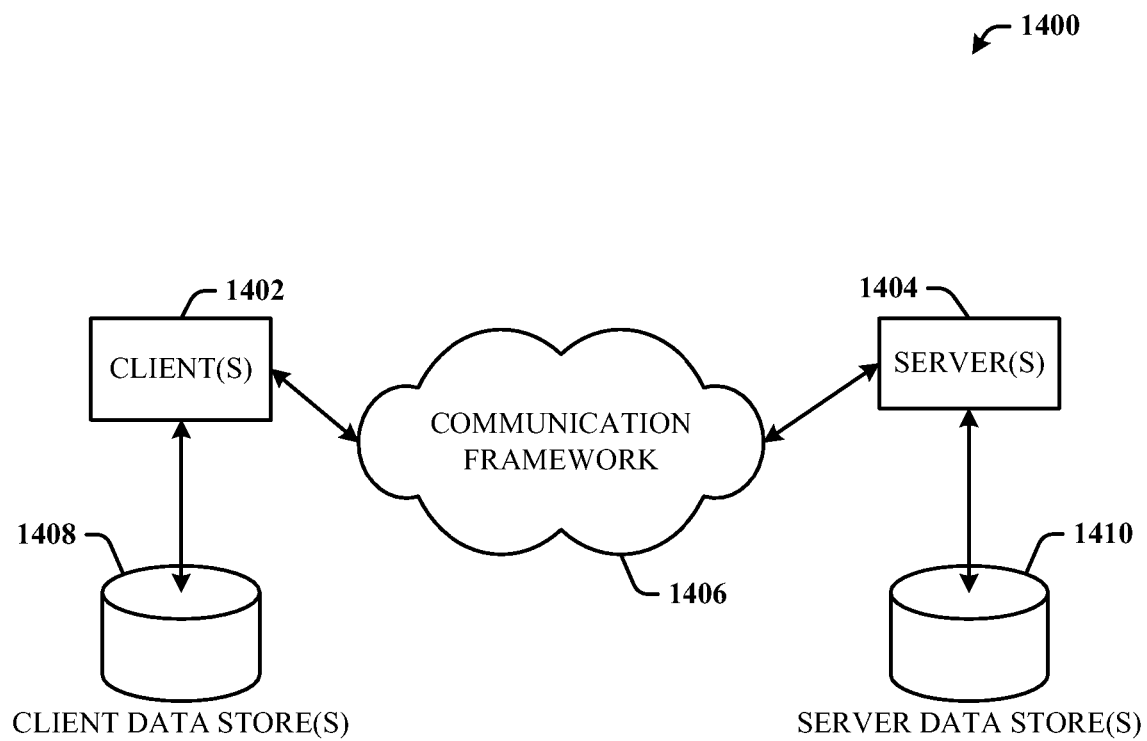
FIG. 14 illustrates a schematic block diagram of an exemplary computing environment for example-driven generation of record matching queries.

Referring now to FIG. 14, there is illustrated a schematic block diagram of an exemplary computing environment 1400 for example-driven generation of record matching queries. The system 1400 includes one or more client(s) 1402. The client(s) 1402 can be hardware and/or software (e.g., threads, processes, computing devices). The client(s) 1402 can house cookie(s) and/or associated contextual information, for example.

The system 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented query system, comprising:
    an input component configured to receive an example set of records from two input relations, the example set comprising:
        pairs of matching records that are labeled as examples of records that are considered a match between the two input relations; and
        pairs of non-matching records that are labeled as examples of records that are not considered a match between the two input relations; and
    a modeling component configured to:
        generate an operator tree based on the example set of records from the two input relations, wherein, to generate the operator tree, the modeling component is further configured to:
            map the pairs of matching records to positive points in a similarity space based on a similarity function;

map the pairs of non-matching records to negative points in the similarity space based on the similarity function;
generate one or more similarity joins of the operator tree, based on the positive points and the negative points in the similarity space;
limit the operator tree to a maximum number of the similarity joins; and
limit individual similarity joins of the operator tree to a maximum number of similarity function predicates; and
generate a query based on the operator tree, the query being configured to identify individual matching records between the two input relations; and
one or more processors configured to execute the input component or the modeling component.

2. The system of claim 1, wherein the operator tree employs an attribute value transformation operator.

3. The system of claim 1, wherein the modeling component is configured to generate the operator tree based on a monotonic property of the similarity function.

4. The system of claim 1, further comprising a quality component configured to quantify a quality of the operator tree based on the matching and non-matching records.

5. The system of claim 4, wherein a quality of the query, as represented by the quality of the operator tree, is based on the non-matching records being less than a user-specified fraction of matching records in a result of the query.

6. The system of claim 1, wherein the example set is provided manually.

7. The system of claim 1, wherein the operator tree is configured to be modified manually.

8. The system of claim 1, wherein the two input relations are joined based on a join predicate that is a conjunction of thresholded similarity values.

9. One or more computer-readable storage devices comprising executable instructions that, when executed, cause at least one processor to perform:
receiving an example set of records from two input relations, the example set comprising:
pairs of matching records that are labeled as examples of records that are considered a match between the two input relations; and
pairs of non-matching records that are labeled as examples of records that are not considered a match between the two input relations;
generating an operator tree based on the example set of records from the two input relations, wherein the generating the operator tree comprises:
mapping the pairs of matching records to positive points in a similarity space based on a similarity function;
mapping the pairs of non-matching records to negative points in the similarity space based on the similarity function;
generating one or more similarity joins of the operator tree based on the positive points and the negative points in the similarity space;
limiting the operator tree to a maximum number of the similarity joins; and
limiting individual similarity joins of the operator tree to a maximum number of similarity function predicates; and
generating a query based on the operator tree, the query identifying individual matching records between the two input relations.

10. The one or more computer-readable storage devices of claim 9, wherein the operator tree employs an attribute value transformation operator.

11. The one or more computer-readable storage devices of claim 9, wherein the operator tree is generated based on a monotonic property of the similarity function.

12. The one or more computer-readable storage devices of claim 9, further comprising executable instructions that, when executed, cause the at least one processor to perform:
quantifying a quality of the operator tree based on the matching and non-matching records.

13. The one or more computer-readable storage devices of claim 12, wherein a quality of the query, as represented by the quality of the operator tree, is based on the non-matching records being less than a user-specified fraction of matching records in a result of the query.

14. The one or more computer-readable storage devices of claim 9, wherein the two input relations are joined based on a join predicate that is a conjunction of thresholded similarity values.

15. A method comprising steps of:
receiving an example set of records from two input relations, the example set comprising:
pairs of matching records that are labeled as examples of records that are considered a match between the two input relations; and
pairs of non-matching records that are labeled as examples of records that are not considered a match between the two input relations; and
generating an operator tree based on the example set of records from the two input relations, wherein the generating the operator tree comprises:
mapping the pairs of matching records to positive points in a similarity space based on a similarity function;
mapping the pairs of non-matching records to negative points in the similarity space based on the similarity function;
generating one or more similarity joins of the operator tree based on the positive points and the negative points in the similarity space;
limiting the operator tree to a maximum number of the similarity joins; and
limiting individual similarity joins of the operator tree to a maximum number of similarity function predicates; and
generating a query based on the operator tree, the query identifying individual matching records between the two input relations,
wherein at least one of the steps is performed by one or more computing devices.

16. The method of claim 15, wherein the operator tree employs an attribute value transformation operator.

17. The method of claim 15, wherein the operator tree is generated based on a monotonic property of the similarity function.

18. The method of claim 15, further comprising:
quantifying a quality of the operator tree based on the matching and non-matching records.

19. The method of claim 18, wherein a quality of the query, as represented by the quality of the operator tree, is based on the non-matching records being less than a user-specified fraction of matching records in a result of the query.

20. The method of claim 15, wherein the two input relations are joined based on a join predicate that is a conjunction of thresholded similarity values.

* * * * *